United States Patent [19]
Buratti et al.

[11] Patent Number: 5,867,986
[45] Date of Patent: Feb. 9, 1999

[54] METHOD AND UNIT FOR CONTROLLING THE SUPERCHARGE PRESSURE OF A TURBODIESEL ENGINE WITH A VARIABLE-GEOMETRY TURBINE

[75] Inventors: Riccardo Buratti, Genoa; Alessandro Carlo; Alberto Pisoni, both of Turin, all of Italy

[73] Assignee: C.R.F. Societa Consortile per Azioni, Strada Turin, Italy

[21] Appl. No.: 788,706

[22] Filed: Jan. 24, 1997

[30] Foreign Application Priority Data

Jan. 26, 1996 [IT] Italy ................................. TO96A0047

[51] Int. Cl.⁶ ................................................. F02B 37/12
[52] U.S. Cl. ....................................................... 60/602
[58] Field of Search ................................. 60/600–603

[56] References Cited

U.S. PATENT DOCUMENTS

| | | | |
|---|---|---|---|
| 4,660,382 | 4/1987 | Ueno et al. ................................. | 60/602 |
| 5,123,246 | 6/1992 | Younessi et al. ......................... | 60/602 |
| 5,442,918 | 8/1995 | Baeuerle et al. ......................... | 60/602 |
| 5,680,763 | 10/1997 | Unland et al. ............................ | 60/602 |

FOREIGN PATENT DOCUMENTS

| | | |
|---|---|---|
| 0 323 256 | 7/1989 | European Pat. Off. . |
| 0 376 703 | 7/1990 | European Pat. Off. . |
| 2 228 768 | 9/1990 | United Kingdom . |

*Primary Examiner*—Michael Koczo
*Attorney, Agent, or Firm*—Armstrong, Westerman, Hattori, McLeland & Naughton

[57] ABSTRACT

A method and apparatus of controlling supercharge pressure following rapid acceleration includes the steps of generating a pressure signal related to the value of the supercharge pressure of an engine; generating a reference signal related to a desired supercharge pressure value; generating a correction signal related to a time derivative of the pressure signal; generating an acceleration output signal as a function of a linear combination of the pressure signal, the reference signal and the correction signal; and supplying the acceleration output signal as a control signal.

8 Claims, 4 Drawing Sheets

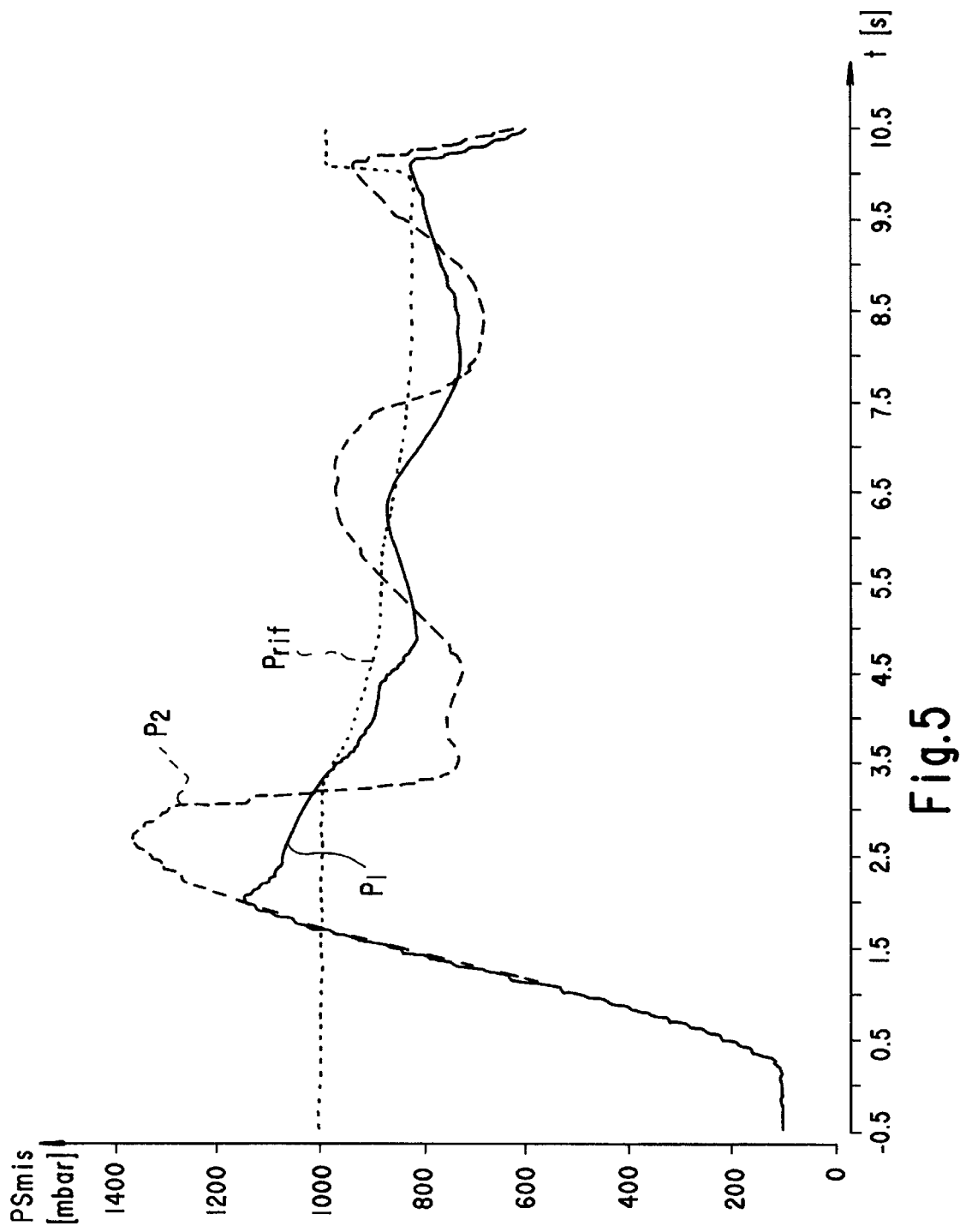

METHOD AND UNIT FOR CONTROLLING THE SUPERCHARGE PRESSURE OF A TURBODIESEL ENGINE WITH A VARIABLE-GEOMETRY TURBINE

BACKGROUND OF THE INVENTION

The present invention relates to a method and unit for controlling the supercharge pressure of a turbodiesel engine with a variable-geometry turbine.

As is known, turbodiesel engines equipped with a variable-geometry turbine provide for more power as compared with traditional types. Such turbines, in fact, permit more rapid response and increased torque at low engine speed, and greater power at high engine speed.

For a clearer understanding of the problems dealt with by the present invention, a turbosupercharger featuring a variable-geometry turbine will now be described with reference to FIG. 1, which shows a turbosupercharger of the type in question, in particular a Garrett VNT25 TD2502.

Number 1 in FIG. 1 indicates a turbosupercharger comprising a spiral-shaped inlet conduit 2 for the exhaust gas produced by combustion in an engine (not shown); a turbine 3 activated by the exhaust gas; a first outlet conduit (not shown) for expelling the exhaust gas after activating the turbine; a second inlet conduit (not shown) for the intake of air; an air compressor 4 activated by turbine 3; and a second outlet conduit 5 for supplying the compressed air to the engine.

Turbine 3 comprises a bladed rotor 6, and a variable-geometry blade system 7 comprising a number of blades 8 located between first inlet conduit 2 and bladed rotor 6.

Blades 8 are adjustable, and are activated by a control assembly 9 comprising a diaphragm actuating member 10 and an actuating assembly (not shown in FIG. 1) for activating actuating member 10 and described in detail later on with reference to FIG. 2.

In actual use, blades 8 vary the section of the exhaust gas passage as a function of the output pressure of compressor 4, regulate the speed of the exhaust gas, and continuously control the supercharge pressure.

The position of blades 8 depends on the operating conditions of the engine. More specifically, at low engine speed and under low load conditions, blades 8 are set to the fully closed position to reduce the section of the gas passage and increase the speed of the gas in turbine 3.

Conversely, at high engine speed, the section of the gas passage through blades 8 is increased, so that the gas flows over the rotor at a slower surface speed, thus reducing the rotation speed of turbine 3, which eventually settles at the right speed for ensuring correct operation of the engine.

As shown in FIG. 2, the actuating assembly—indicated by 11—for activating actuating member 10 comprises a vacuum pump 12 activated by the engine—indicated by 13—to which turbosupercharger 1 is fitted; and a known vacuum-modulating three-way solenoid valve 14 connected to vacuum pump 12 by an input line 15.

More specifically, vacuum pump 12 is driven by the camshaft 13a or the drive shaft (not shown) of engine 13.

Solenoid valve 14 is connected to actuating member 10 by an output line 16, and is controlled by a control unit 17.

Control unit 17 comprises a pressure sensor 18 and an electronic central control unit 19.

Pressure sensor 18 is located along second outlet conduit 5 of turbosupercharger 1, and generates a pressure signal PSmis proportional to the supercharge pressure in second outlet conduit 5 of supercharger 1.

Electronic central control unit 19 receives pressure signal PSmis and a reference signal PSrif proportional to a desired supercharge pressure value and mapped in a memory (not shown), and generates a control signal DutyV related to the optimum opening angle of blades 8 in FIG. 1.

Control signal DutyV is supplied to actuating assembly 11 of actuating member 10, and more specifically to solenoid valve 14.

In actual use, vacuum pump 12 generates a vacuum, which is supplied to and modulated by solenoid valve 14 according to the value of control signal DutyV, so as to control the diaphragm of actuator 10 in known manner (not shown) and so adjust the position of blades 8 in FIG. 1.

In traditional control systems, control signal DutyV of solenoid valve 14 is generated by a known proportional-integral control—not described in detail—which performs a transfer function having, for the proportional and integral part respectively, two multiplication coefficients Kp and Ki, which assume a fixed value regardless of the operating point of the engine.

Proportional-integral control, however, is poorly suited to controlling the power output of a turbodiesel engine with a variable-geometry turbine during acceleration, in that it is slow and acts on blades 8 (FIG. 1) with a delay which is incompatible with the sudden increase in power of the engine at the acceleration stage.

The delay referred to is manifested by the supercharge pressure overshooting the desired value, and subsequently settling at the desired value accompanied by oscillations with a small damping coefficient.

SUMMARY OF THE INVENTION

It is an object of the present invention to provide a control method and unit designed to overcome the drawbacks of known systems.

According to the present invention, there is provided a method of controlling the supercharge pressure of a turbodiesel engine comprising a turbosupercharger with a variable-geometry turbine having blades movable between two limit positions, and a control assembly for controlling said blades and driven by a control signal; characterized by comprising the steps of:

a) generating a pressure signal related to the value of the supercharge pressure of said engine;

b) generating a reference signal related to a desired value of said supercharge pressure;

c) generating a correction signal related to a time derivative of said pressure signal;

d) generating an acceleration output signal as a function of a linear combination of said pressure signal, of said reference signal and of said correction signal; wherein said acceleration output signal represents said control signal.

The present invention also relates to a control unit for controlling the supercharge pressure of a turbodiesel engine comprising a turbosupercharger with a variable-geometry turbine having blades movable between two limit positions, and a control assembly for controlling said blades and driven by a control signal; said control unit comprising pressure sensing means generating a pressure signal proportional to the supercharge pressure in said engine; characterized by comprising deriving means for generating a correction signal proportional to a derivative of said pressure signal; and combining means for effecting a linear combination of said pressure signal, said correction signal and said reference signal, and for generating an acceleration output signal constituting said control signal.

BRIEF DESCRIPTION OF THE DRAWINGS

A preferred, non-limiting embodiment of the present invention will be described by way of example with reference to the accompanying drawings, in which:

FIG. 5 shows a graph illustrating the supercharge pressure versus time curve obtainable using the method according to the present invention.

DETAILED DESCRIPTION OF THE INVENTION

Figure 2:
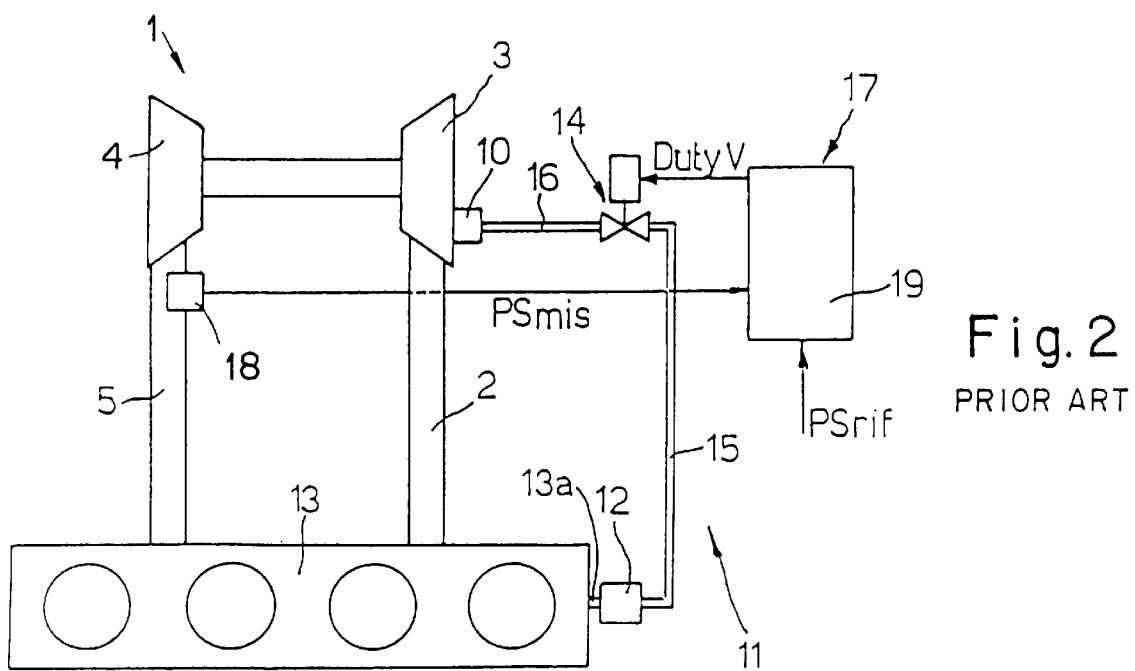
FIG. 2 shows a block diagram of a known control unit of a turbodiesel engine with a variable-geometry turbine.
Figure 3:
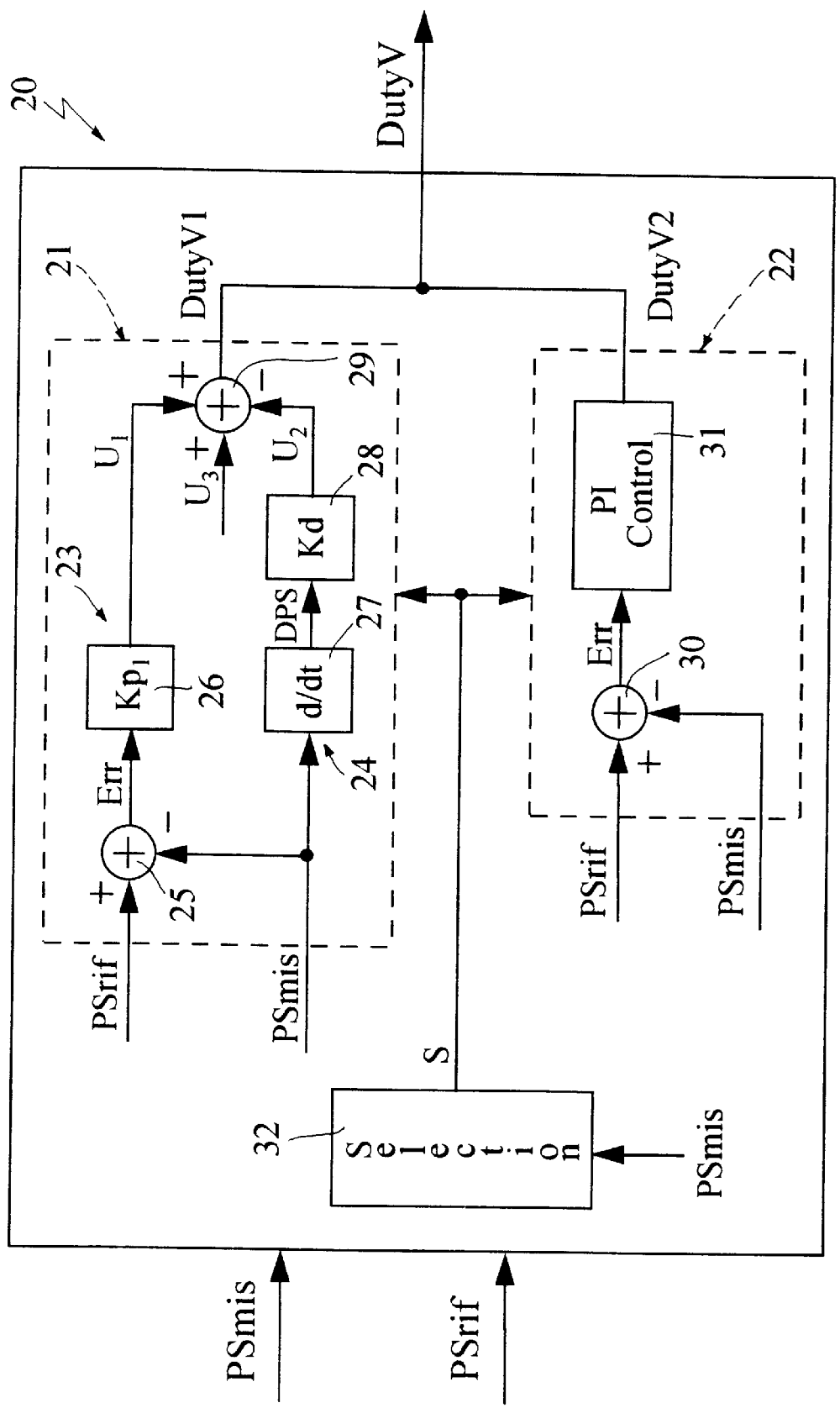
FIG. 3 shows a block diagram of a control unit in accordance with the present invention.

Like unit 17 in FIG. 2, the FIG. 3 control unit, indicated by 20, receives reference signal PSrif and pressure signal PSmis, and generates control signal DutyV of solenoid valve 14.

Control unit 20 comprises a mixed proportional-derivative control group (hereinafter abbreviated mixed PD control group) 21, and a proportional-integral control group (hereinafter abbreviated PI control group) 22, which selectively control solenoid valve 14 in FIG. 1 according to the operating state of the engine.

Mixed PD control group 21 comprises a proportional branch 23 and a derivative branch 24.

Proportional branch 23 comprises a first adding block 25 receiving pressure and reference signals PSmis and PSrif, and generating a first error signal Err equal to the difference PSrif−PSmis; and a first multiplying block 26 receiving error signal Err, and generating a proportional signal $U_1$ equal to first error signal Err multiplied by a first constant $Kp_1$.

Derivative branch 24 comprises a deriving block 27 receiving pressure signal PSmis, and generating a first correction signal DPS equal to the time derivative of pressure signal PSmis; and a second multiplying block 28 receiving first correction signal DPS, and generating a derivative signal $U_2$ equal to first correction signal DPS multiplied by a second constant Kd.

A second adding block 29 receives proportional signal $U_1$, derivative signal $U_2$ and an initiating signal $U_3$, and generates an acceleration output signal DutyV1. More specifically, second adding block 29 performs the algebraic sum:

$$DutyV2=U_1+U_3-U_2$$

Figure 1:
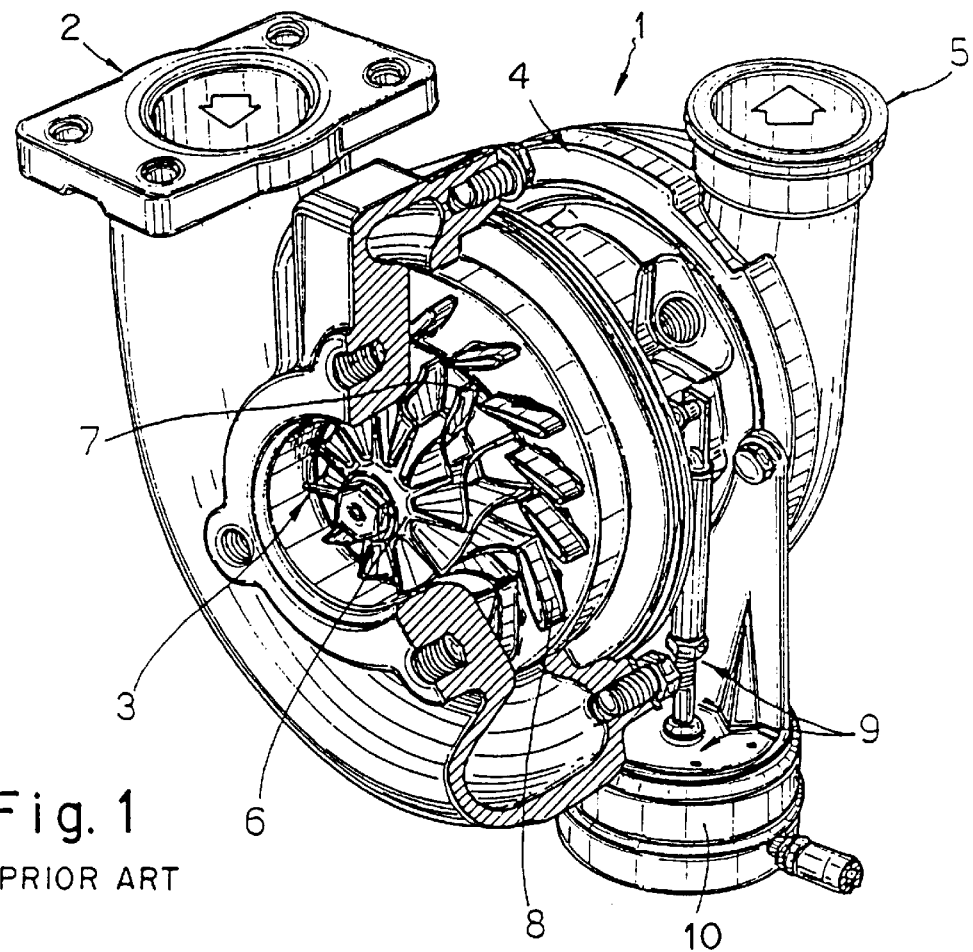
FIG. 1 shows a partially sectioned view in perspective of a turbosupercharger with a variable-geometry turbine.

Initiating signal $U_3$ is a constant-value signal for defining a reference position of blades 8 in FIG. 1 in the absence of proportional and derivative signals $U_1$, $U_2$.

PI control group 22 comprises a third adding block 30 receiving pressure and reference signals PSmis and PSrif, and generating a second error signal Err equal to PSrif−PSmis; and a proportional-integral control block 31 receiving second error signal Err, and generating a proportional-integral output signal DutyV2.

Control block 31 performs a transfer function having, for the proportional and integral part respectively, two multiplication coefficients $Kp_2$ and Ki, the value of which depends on the operating point of the engine, and is mapped in a memory (not shown). The value of multiplication coefficient $Kp_2$ is determined using a pseudo-random method; and the value of multiplication coefficient Ki is related to that of $Kp_2$ by a constant which takes into account the gain and cutoff frequency of control block 31.

PD and PI control groups 21 and 22 are enabled alternately by a selection device 32 receiving pressure signal PSmis, and which, on the basis of pressure signal PSmis, generates an enabling signal S, the value of which determines operation of PD control group 21 or PI control group 22.

The control signal DutyV generated by control unit 20 equals acceleration output signal DutyV1 or proportional-integral output signal DutyV2, depending on which control group 21 or 22 is enabled.

Figure 4:
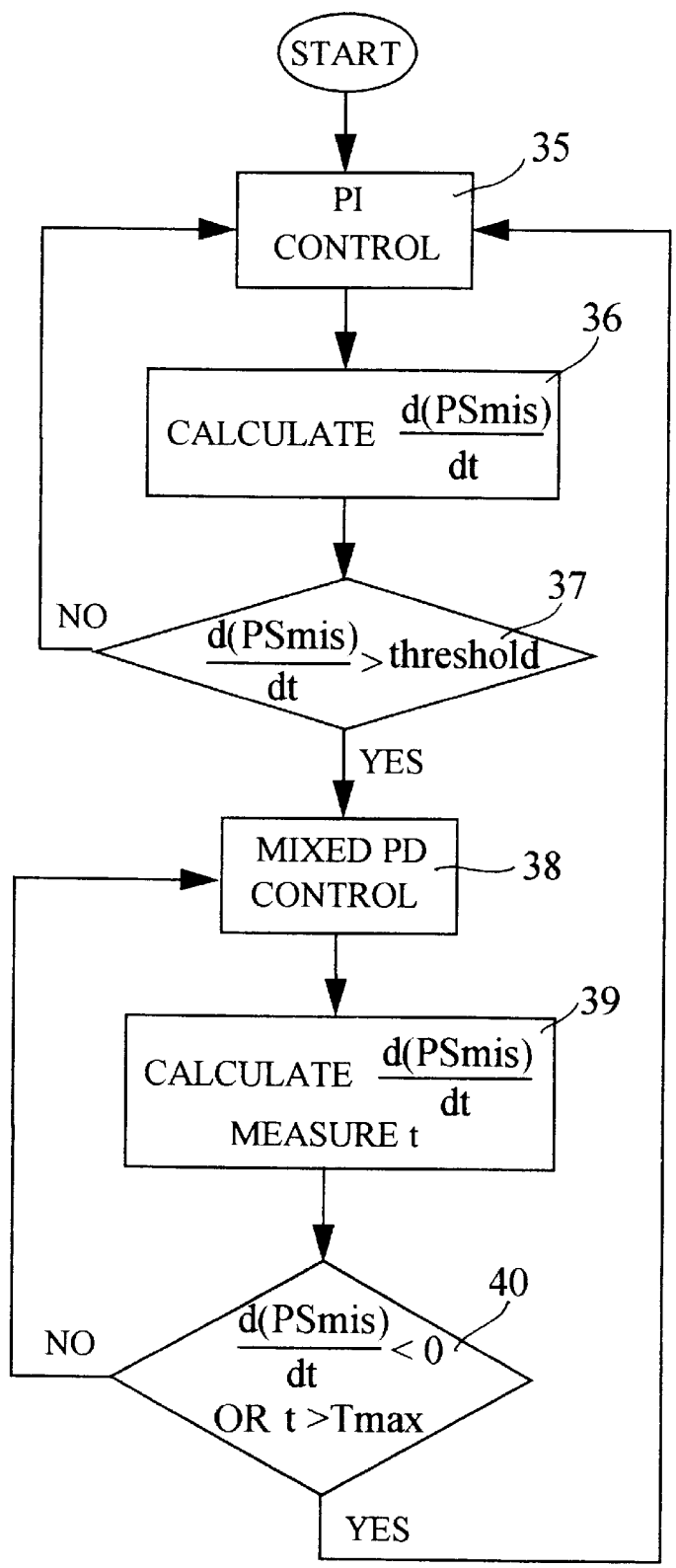
FIG. 4 shows a flow chart of the operation of a block in FIG. 3.

The above enabling function is performed using the algorithm shown in FIG. 4 and described below.

To begin with, selection device 32 enables PI control group 22 (block 35), so that, at this phase, control signal DutyV equals proportional-integral output signal DutyV2 and control is proportional-integral.

During operation of turbosupercharger 1, the supercharge pressure of the engine is monitored continually by calculating a time derivative of pressure signal PSmis (block 36).

Upon selection device 32 detecting that said derivative exceeds a predetermined threshold value (block 37), i.e. indicating a sharp increase in supercharge pressure, it enables mixed PD control group 21 (block 38), so that, at this phase, control signal DutyV equals acceleration output signal DutyV1 and control is proportional-derivative.

In the meantime, selection device 32 continues monitoring the supercharge pressure derivative and the time t elapsed since the threshold was crossed (block 39), to determine whether the supercharge pressure has reached the supercharge peak, or whether, following crossover of the threshold, the rate of increase in supercharge pressure has fallen to such a value that it would take too long for the desired value (proportional to PSrif) to be reached.

Upon selection device 32 detecting that the time derivative of pressure signal PSmis equals zero or less than zero, or that time t exceeds the predetermined maximum value Tmax (block 40), it again enables PI control group 22 by going back to block 35.

In other words, when the supercharge pressure increases sharply and PD control group 21 is enabled, proportional branch 23 generates proportional signal $U_1$, which increases or decreases the value of initiating signal $U_3$ by a quantity proportional to the difference between pressure signal PSmis and reference signal PSrif.

At the same time, derivative branch 24 determines a first correction signal DPS equal to the time derivative of pressure signal PSmis, and generates a derivative signal $U_2$, which contributes towards reducing control signal DutyV, here equal to acceleration output signal DutyV1. Derivative branch 24 therefore provides for reducing the value of control signal DutyV as of the instant in which the supercharge pressure derivative exceeds the predetermined threshold, i.e. in advance of the instant in which the desired pressure value is reached.

The reason for this advanced correction of control signal DutyV is that, despite proportional signal $U_1$ generated by proportional branch 23 eliminating its contribution to control signal DutyV when the desired supercharge pressure value is reached, the supercharge pressure continues rising on account of the large amount of residual energy contained in the exhaust gas.

An important point to note is how deriving block 27 of mixed PD control group 21 operates directly on pressure signal PSmis proportional to the measured supercharge pressure, as opposed to first error signal Err proportional to the pressure error. Moreover, deriving block 27 represents the most suitable performance estimator for faithfully modelling the increase in supercharge pressure of turbodiesel engines with a variable-geometry turbine, and is therefore the best type of control for generating derivative signal $U_2$ used for advanced correction of control signal DutyV.

As soon as the supercharge pressure stops rising (or after a predetermined maximum time), control is restored to PI control group 22, which operates in the normal manner to ensure the precise desired supercharge pressure value is reached.

A return to proportional-integral control requires that the initial state of the integrator in the integral block be supplied, i.e. that PI control group 22 be supplied with an integral contribution value I plausible with previous control developments. More specifically, the contribution value is determined as a function of engine speed and load, and is memorized in an appropriate vector.

FIG. 5 shows a number of time curves relative to dynamic bench tests conducted on a turbodiesel engine with a variable-geometry turbine during acceleration and in second gear as of 2000 revolutions per minute.

More specifically, the FIG. 5 graph shows the supercharge pressure curve $P_1$ relative to the method according to the present invention (continuous line); the supercharge pressure curve $P_2$ relative to straightforward proportional-integral control (dash line); and the reference supercharge pressure curve $P_{rif}$ (dotted line).

As can be seen, the method according to the invention provides for considerably reducing the supercharge pressure overshoot peak, and for following the reference pressure curve fairly closely with only low-amplitude oscillation.

The advantages of the present method are as follows. In particular, it provides for better controlling the output power of the engine by reducing both the duration and amplitude of the oscillations involved in reaching the desired supercharge pressure value, thus greatly reducing the time taken by the engine to reach the optimum running condition.

Moreover, the supercharge pressure overshoot peak is controllable by working on constants $Kp_1$ and Kd.

Using proportional-integral control during the steady-state phase provides, in known manner, for controlling variations in the reference signal with a zero tracking error in the absence of rapid increases in pressure.

Finally, the present method is easy to implement and highly stable.

Clearly, changes may be made to the control method and unit as described and illustrated herein without, however, departing from the scope of the present invention.

We claim:

1. A method of controlling the supercharge pressure of a turbodiesel engine (13) comprising a turbosupercharger (1) with a variable-geometry turbine (3) having blades (8) movable between two limit positions, and a control assembly (9) for controlling said blades (8) and driven by a control signal (DutyV); characterized by comprising the steps of:

a) generating a pressure signal (PSmis) related to the value of the supercharge pressure of said engine (13);

b) generating a reference signal (PSrif) related to a desired value of said supercharge pressure;

c) generating a correction signal (DPS) related to a time derivative of said pressure signal (PSmis);

d) generating an acceleration output signal (DutyV1) as a function of a linear combination of said pressure signal (PSmis), of said reference signal (PSrif) and of said correction signal (DPS); wherein said acceleration output signal (DutyV1) represents said control signal (DutyV).

2. A method as claimed in claim 1, characterized in that said step d) comprises the steps of:

f) determining a difference between said reference signal (PSrif) and said pressure signal (PSmis) to generate an error signal (Err);

g) multiplying said error signal (Err) by a first constant ($Kp_1$) to generate a proportional signal ($U_1$);

h) multiplying said correction signal (DPS) by a second constant (Kd) to generate a derivative signal ($U_2$);

i) generating said acceleration output signal (DutyV1) by adding said proportional signal ($U_1$) and a constant initiating signal ($U_3$) and subtracting said derivative signal ($U_2$); said initiating signal ($U_3$) defining a reference position of said blades (8).

3. A method as claimed in claim 1, characterized by comprising the steps of:

l) calculating a first numeric value proportional to a derivative of said pressure signal (PSmis);

m) comparing said first numeric value with a first predetermined threshold value, and performing said steps c), d), e) in the event said first numeric value exceeds said first predetermined threshold value.

4. A method as claimed in claim 3, characterized by comprising the steps of:

n) generating a time signal (t) upon said first numeric value exceeding said first predetermined threshold value;

p) calculating a second numeric value proportional to a derivative of said pressure signal (PSmis);

q) generating a proportional-integral output signal (DutyV2) if said second numeric value is less than or equal to zero, or if said time signal (t) is greater than a predetermined maximum value (Tmax); wherein said proportional-integral output signal (DutyV2) represents said control signal (DutyV).

5. A control unit (20) for controlling the supercharge pressure of a turbodiesel engine (13) comprising a turbosupercharger (1) with a variable-geometry turbine (3) having blades (8) movable between two limit positions, and a control assembly (9) for controlling said blades (8) and driven by a control signal (DutyV); said control unit (20) comprising pressure sensing means (18) generating a pressure signal (PSmis) proportional to the supercharge pressure in said engine (13); characterized by comprising deriving means (27) for generating a correction signal (DPS) proportional to a derivative of said pressure signal (PSmis); and combining means (25, 26, 28, 29) for effecting a linear combination of said pressure signal (PSmis), said correction signal (DPS) and said reference signal (PSrif), and for generating an acceleration output signal (DutyV1) constituting said control signal (DutyV).

6. A unit as claimed in claim 5, characterized in that said combining means (25, 26, 28, 29) comprise:

subtracting means (25) for determining a difference between said reference signal (PSrif) and said pressure signal (PSmis) to generate an error signal (Err);

first multiplying means (26) for multiplying said error signal (Err) by a first constant ($Kp_1$) to generate a proportional signal ($U_1$);

second multiplying means (28) for multiplying said correction signal (DPS) by a second constant (Kd) to generate a derivative signal ($U_2$);

adding means (29) for generating said acceleration output signal (DutyV1) by adding said proportional signal ($U_1$) and an initiating signal ($U_3$) and subtracting said derivative signal ($U_2$); said initiating signal ($U_3$) defining a reference position of said blades (8).

7. A unit as claimed in claim 5, characterized by comprising enabling means (32) for generating an enabling signal (S) for said deriving means (27) and said combining means (25, 26, 28, 29); said enabling means (32) comprising calculating means (36, 39) for determining a first numeric value related to a derivative of said pressure signal (PSmis); and derivative comparing means (37, 40) for comparing said first numeric value with a first predetermined threshold value; said enabling signal (S) enabling said deriving means (27) and said combining means (25, 26, 28, 29) in the event said first numeric value is greater than said first predetermined threshold value.

8. A unit as claimed in claim 7, characterized by comprising a proportional-integral group (22) receiving said pressure signal (PSmis) and said reference signal (PSrif), and generating a proportional-integral output signal (DutyV2); in that said enabling means (32) also comprise clock means (39) for generating a time signal (t) upon said first numeric value exceeding said first predetermined threshold value; and time comparing means (40) for comparing said time signal (t) with a predetermined maximum value (Tmax); said calculating means (36, 39) generating a second numeric value proportional to a derivative of said pressure signal (PSmis), and said derivative comparing means (40) comparing said second numeric value with a second predetermined threshold value; said enabling signal (S) enabling said proportional-integral group (22) in the event said second numeric value is less than or equal to zero, or said time signal (t) is greater than a predetermined maximum value (Tmax); and said proportional-integral output signal (DutyV2) defining said control signal (DutyV).

\* \* \* \* \*